(12) United States Patent
Wilens

(10) Patent No.: US 7,092,952 B1
(45) Date of Patent: Aug. 15, 2006

(54) METHOD FOR GROUPING COMPUTER SUBSCRIBERS BY COMMON PREFERENCES TO ESTABLISH NON-INTIMATE RELATIONSHIPS

(76) Inventor: Peter Wilens, 2331 Cheswick, Troy, MI (US) 48084

( * ) Notice: Subject to any disclaimer, the term of this patent is extended or adjusted under 35 U.S.C. 154(b) by 239 days.

(21) Appl. No.: 09/997,018

(22) Filed: Nov. 20, 2001

(51) Int. Cl.
G06F 17/30 (2006.01)
(52) U.S. Cl. .................................... 707/100
(58) Field of Classification Search .............. 707/5, 707/100, 102, 1
See application file for complete search history.

(56) References Cited

U.S. PATENT DOCUMENTS

| | | | |
|---|---|---|---|
| 4,348,744 A | 9/1982 | White | |
| 5,086,394 A | 2/1992 | Shapira | |
| 5,128,871 A | 7/1992 | Schmitz | |
| 5,796,395 A | 8/1998 | de Hond | |
| 5,950,200 A | 9/1999 | Sudai et al. | |
| 5,963,951 A * | 10/1999 | Collins | 707/102 |
| 6,020,810 A | 2/2000 | Har-Even | |
| 6,052,122 A * | 4/2000 | Sutcliffe et al. | 345/751 |
| 6,058,367 A | 5/2000 | Sutcliffe et al. | |
| 6,061,681 A * | 5/2000 | Collins | 707/5 |
| 6,208,866 B1 * | 3/2001 | Rouhollahzadeh et al. | 455/456.5 |
| 6,249,282 B1 * | 6/2001 | Sutcliffe et al. | 345/751 |
| 6,272,467 B1 * | 8/2001 | Durand et al. | 705/1 |
| 6,311,178 B1 | 10/2001 | Bi et al. | |
| 6,480,885 B1 * | 11/2002 | Olivier | 709/207 |

\* cited by examiner

Primary Examiner—Safet Metjahic
Assistant Examiner—Haythim Alaubaidi
(74) Attorney, Agent, or Firm—Young & Basile, P.C.

(57) ABSTRACT

A method for grouping computer subscribers by common preferences to establish non-intimate relationships. The method of the present invention provides a subscriber access to a computerized database having stored non-intimate profile information from fellow subscribers. The user registers and stores non-intimate profile information into a database. The present invention groups the user with at least two of the fellow subscribers to form at least one group based on similarities between the subscriber's profile information and the fellow subscriber's profile information. The present invention utilizes an algorithm to determine a level of similarity between the subscriber's profile information and the fellow subscribers' profile information, wherein preferences are assigned integer values concatenated to form a lookup key and used to access an entry in a table containing the corresponding similarity value between two preferences. The similarity values between all profile preferences are added to create a final similarity total for the subscribers. Multi-way matching is also employed to ensure that similarity values for each subscriber in the group and all other subscribers in said group exceeds a threshold value. The list of subscribers in the group as well as similarities between the subscribers in the group are displayed for viewing and for editing by the subscriber.

8 Claims, 23 Drawing Sheets

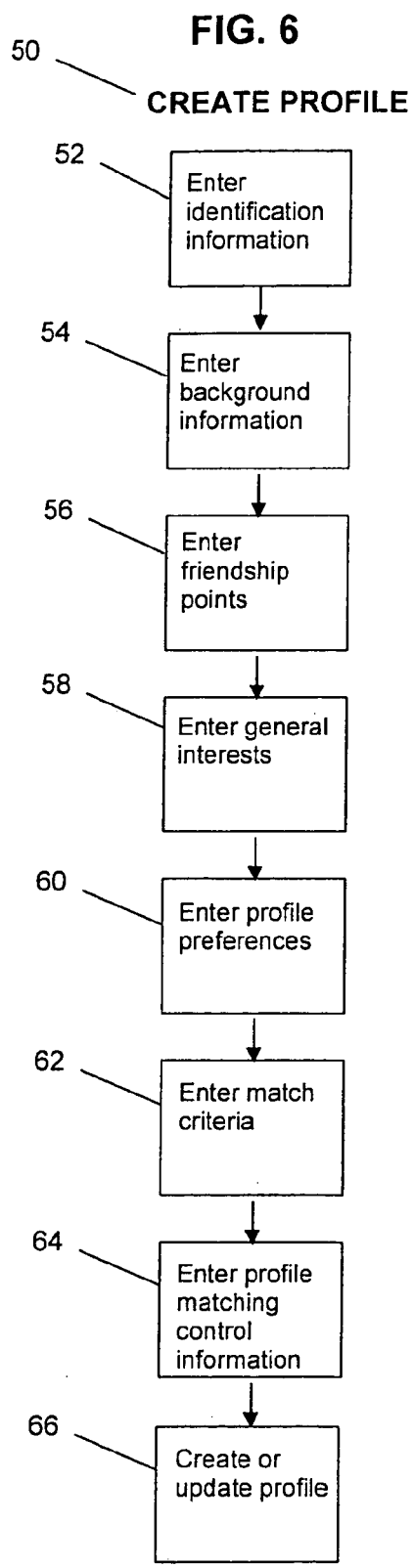

FIG. 6A

PROFILE

Home

Profile

Create Groups

View Groups

Modify Groups

Schedule Groups

Bulletin Board

Chat Room

Profile – Identification Information — 52

Name
City
State
Zip Code
Phone
Email

Profile – Background Information — 54

Birth Year
Race
Religion
Marital Status
Children (Y/N)
Education Level
Job Type

<< BACK    NEXT >>

FIG. 6B

Profile – Friendship Points —— 56

Please enter the data below that best describes you. We need this information to match you to others. So, for each characteristic below, select the number that best describes you.

1. Describe your preferred style of conversation? [▼]
   (where: 1- conservative and considerate, 5-direct hold no punches)

2. Do you mind friends dropping over without giving you notice? [▼]
   (Where: 1-prefer friends give me notice, 5-friends should feel free to drop by at any time)

3. How willing are you to bend your schedule to meet with friends? [▼]
   (Where: 1-schedule hard to bend, 5-I'm almost always willing to meet with friends)

4. What type of friends are you generally looking for? [▼]
   (Where: 1-casual friends, 5-true and trusted friends)

5. How often do you like to get together or "hang-out" with friends? [▼]
   (Where 1-daily, 2-twice weekly, 3-weekly, 4-twice monthly, 5-monthly)

6. To what degree can you do things without your significant other? [▼]
   (Where 1-somewhat limited, 5-no significant other OR am free to do as I wish)

[<< BACK]   [NEXT >>]

FIG. 6C

Profile – General Interests — 59

| | | |
|---|---|---|
| Sports (player) | [▼] | [▼] |
| Hobbies | [▼] | [▼] |
| Intellectual | [▼] | [▼] |
| Spiritual | [▼] | [▼] |
| Entertainment | [▼] | [▼] |
| Investing | [▼] | [▼] |
| Music | [▼] | [▼] |

Profile – Preferences — 61

| | 1 | 2 | 3 | 4 | 5 |
|---|---|---|---|---|---|
| Best Get Together Days | [▼] | [▼] | [▼] | [▼] | [▼] |
| Best Get Together Times | [▼] | [▼] | [▼] | [▼] | [▼] |

Largest group of people you'd prefer to get together with: [▼]

Maximum Driving Distance [▼]

[<< BACK]  [NEXT >>]

FIG. 6D

Match - Criteria — 63

Select the items that are very important to you — 65

| | Characteristics | Select Item Values | How Strongly Do You Feel (use 1-10 Scale) |
|---|---|---|---|
| 1 | ▼ | ▼ | ▼ |
| 2 | ▼ | ▼ | ▼ |
| 3 | ▼ | ▼ | ▼ |
| 4 | ▼ | ▼ | ▼ |
| 5 | ▼ | ▼ | ▼ |

Select the characteristics that your friends MUST NOT Have — 67

| | Characteristics | Characteristic Value |
|---|---|---|
| 1 | ▼ | ▼ |
| 2 | ▼ | ▼ |
| 3 | ▼ | ▼ |
| 4 | ▼ | ▼ |
| 5 | ▼ | ▼ |

<< BACK    NEXT >>

FIG. 6E

Profile – Matching Control — 69

I wished to be matched into one or more groups in the following manner:

Permit only the computer to match me into group(s) ☐

Also permit people to match me into a group(s) ☐ (also called Custom Groups)

(i.e., users have the option to develop custom groups by selecting matching criteria to be used to select user profiles within the profile database. For example, if a user wishes to establish a golf group, they would select "golf" as the selection criteria in the User Develop Group section of this system)

No longer make my profile available to people other than my current groups: ☐

Remove my profile from all groups even including my current groups: ☐

[ CREATE / UPDATE MY PROFILE ] — 71

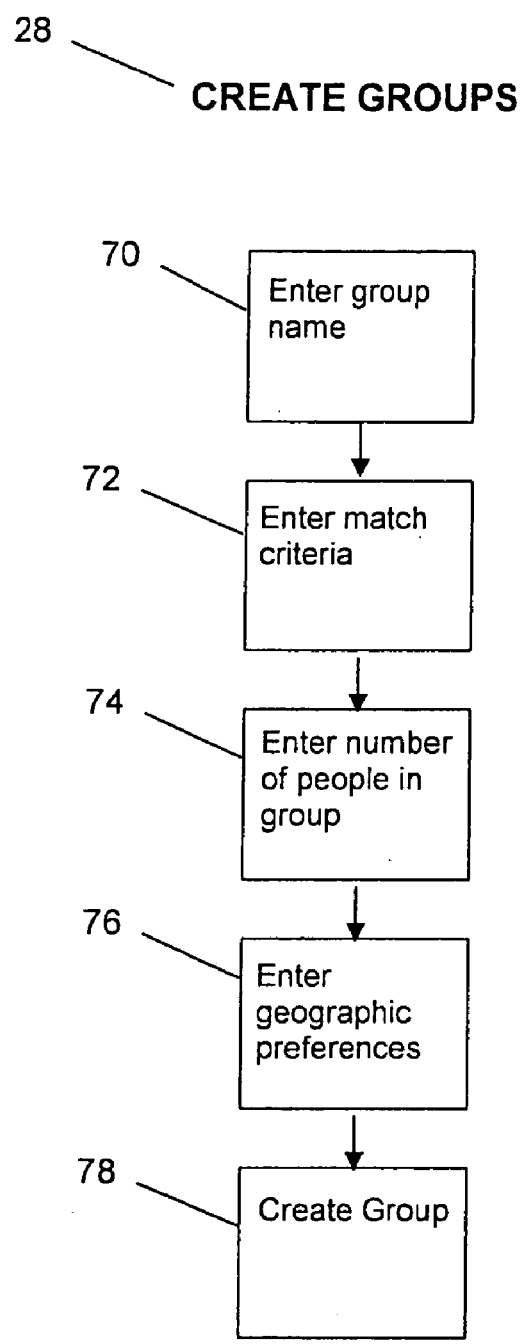

FIG. 7A

Create Groups — 28

- Home
- Profile
- Create Groups
- View Groups
- Modify Groups
- Schedule Groups
- Bulletin Board
- Chat Room This section allows you to identify a group of people with a common set of characteristics. For example, you can develop a group of 8 people in your area who like to golf.

Select criteria that you wish to match on:

Enter Group Name: [         ] — 73

Interests — 75

1. Sports (player) [   ▼]
2. Hobbies [   ▼]
3. Intellectual [   ▼]
4. Spiritual [   ▼]
5. Entertainment [   ▼]
6. Investing [   ▼]
7. Music [   ▼]

Number of people to include in group: — 77

[   ▼]

79

Find people within [  ▼] miles of this zip code [   ▼]

CREATE GROUP — 81

FIG. 10

Find New People for Groups

This section allows you to identify and add new people to currently existing groups. For example, assuming your earlier established golf group was 2 people short, you could use this to find 2 people to add to your group.

Select one of the following options: (check only one box)

1. Allow computer to select new members that match group using the standard matching criteria: ☐

2. I would like to identify matching criteria that the computer should use to find the new group members ☐

Interests — 111

| | |
|---|---|
| 1 Sports (player) | ▼ |
| 2 Hobbies | ▼ |
| 3 Intellectual | ▼ |
| 4 Spiritual | ▼ |
| 5 Entertainment | ▼ |
| 6 Investing | ▼ |
| 7 Music | ▼ |

Number of people to add to group:
113 ▼

115 — Find people within [▼] miles of this zip code [▼]

FIND AND ADD NEW PEOPLE TO GROUP — 109

Sidebar: Home, Profile, Create Groups, View Groups, Modify Groups, Schedule Groups, Bulletin Board, Chat Room To view the new people the computer has added to your group, use the VIEW GROUPS screen

FIG. 14A

Individual Matches

Person #1 ●  ←————————→  ● Person #2

Person #1 ●  ←————————→  ● Person #3

Person #1 ●  ←————————→  ● Person #4

Person #1 ●  ←————————→  ● Person #5

Person #1 ●  ←————————→  ● Person #6

METHOD FOR GROUPING COMPUTER SUBSCRIBERS BY COMMON PREFERENCES TO ESTABLISH NON-INTIMATE RELATIONSHIPS

FIELD OF THE INVENTION

The present invention relates to a method of grouping computer subscribers by common preferences, and in particular, to a method of grouping computer subscribers by utilizing an algorithm to establish non-intimate relationships by determining a level of similarity between computer subscribers.

BACKGROUND OF THE INVENTION

Non-intimate relationships can best be described as those relationships that are not intimate in nature. Whereas intimate relationships focus on dating and courtship, non-intimate relationships include relationships such as general friendships, golfing buddies, sewing partners, investment groups, and sailing clubs to name a few.

For many people, the act of acquiring and maintaining a non-intimate relationship is a difficult, time-consuming process that is both challenging and difficult. In general, the method of acquiring new non-intimate relationships can best be described as ad hoc, resulting from activities such as attending parties, coaching teams, playing on sports teams, or taking a walk in the park. Once people have initially met, non-intimate relationships take a number of mutually agreeable interactions before they build into what can best be described as relationships of value. Only a small percentage of people who meet develop their relationship into a non-intimate relationship of value.

Although there are many established formalized methods to initiate intimate relationships, such as dating services and classified ads, the development of non-intimate relationships usually must follow a different course. This is simply because people feel uncomfortable and avoid situations where they may be matched with a particular person with the idea of establishing a non-intimate relationship. While people generally feel comfortable going out in groups to make new non-intimate relationships, they generally, and strongly associate one-on-one matching methods such as dating services and classified ads as methods to build intimate relationships. Given the large differences between building an intimate and a non-intimate relationship, current methods to establish intimate relationships would largely fail if one were to attempt to use the same methods to establish non-intimate relationships.

Previous computerized methods have been established to develop intimate relationships. Such methods include on-line dating services for locating and matching people based on a user's characteristics and criteria for establishing intimate relationships. These one-on-one matching methods include the use of a computer network system or the use of the internet. While the computer algorithms used for one-on-one matching of people can vary, a common method used is the "Assignment Method" which is well-documented in operations research publications. This method and more recent computer dating methods suggest that the one-on-one matching of individuals should be performed in a "two-way" manner such that two people are only paired up only if they closely match each other's stated preferences. Results are then relayed to the users of the service through a variety of means such as web pages, telephones and pagers. While these methods suggest that one could be matched to make new acquaintances and friends, it is doubtful that most people would use this one-on-one matching method to secure new "non-intimate" friends for reasons earlier described. Furthermore, the methods described in this prior art are insufficient to match people into groups of three or more people which often provide people with the best vehicle to establish new non-intimate relationships.

Whereas the current matching methods employed to pair people up primarily requires that people be interactively compared to the others and scored for mutual compatibility as illustrated in FIG. 14A, the methods used to match people into groups are different and more complex as illustrated in FIG. 14B. While the one-to-one (individual) pairing of people requires the compatibility score between two people to be above a certain optimized value, the many-to-many (group) comparisons and placement of people into groups requires that all people are compatible with every other person within the group. For example, using FIG. 14B, if people #2–6 were mutually and highly compatible with person #1, but not with each other, they would not be placed into the same group. Moreover, only one of them at most could be placed into the eventual group(s) to which person #1 is assigned.

Additional shortfalls of the prior art as it relates to matching people into groups, fall into two areas including: (1) lack of group-specific parameters and functionality to establish a group; and (2) lack of functionality normally associated with establishing and maintaining a group once established. With respect to the first area, as current art is focused on making one-to-one matches, current art does not include provisions for allowing users to specify a preferred group size. The prior art also does not provide for users to specify preferred group meeting times which are often critical to matching people into groups of larger size. With respect to the second area, the prior art does not provide for an automated means to find new mutually compatible members for an established group from a much larger pool of candidates contained within a profiles database. Moreover, the prior art does not include functionality that tends to be strongly associated with managing group activities such as providing capabilities to schedule meetings and maintain an on-line posting of group events.

It would be desirable to provide a method that directly addresses the acquisition and maintenance of non-intimate relationships. It would also be desirable to establish a method of developing non-intimate relationships for people desiring to meet or interact with other persons "in person". In addition, it would also be desirable to establish a method for establishing and maintaining non-intimate relationships between groups of people.

SUMMARY OF THE INVENTION

The present invention provides a method for grouping computer subscribers by common preferences to establish non-intimate relationships. The method includes the steps of providing a subscriber access to a computerized database having stored profile information from fellow subscribers. The subscriber registers and stores non-intimate profile information into the computerized database. The subscriber is grouped with at least two of the fellow subscribers to form at least one group based on similarities between the subscriber's profile information and the fellow subscriber's profile information. The group of subscribers and the similarities therebetween are then displayed.

In registering and storing non-intimate profile information, the subscriber enters biographical information and personal preferences. In grouping the subscriber with fellow subscribers, an algorithm is utilized that determines the level of similarity between the subscriber's profile information and the fellow subscriber's profile information wherein the preferences for each profile question are assigned integer answer values, similarities in answers between the two subscribers are quantified through a fuzzy logic table lookup, summed, and then compared to group subscribers with fellow subscribers. For fellow subscribers to be assigned to the same group, a multi-way match is performed to ensure all members are compatible with one another.

In addition, the subscriber may utilize its own matching criteria for establishing an acceptable level of similarity between the subscriber and the fellow subscribers placed in the group.

In displaying the selected subscribers in the group and the similarities between the subscribers, meeting times may be selected and posted for the group while notifying all subscribers in the group of the meeting times. Messages may be posted for the groups, and real time dialog may be posted between subscribers of the groups.

BRIEF DESCRIPTION OF THE DRAWINGS

In the drawings, like-referenced numerals refer to similar elements throughout the various views.

FIG. 6 is a flow chart for creating a profile utilized in the method of the present invention.

FIG. 6A is a computer screen for entering biographical information of a subscriber's profile utilized in the method of the present invention.

FIG. 6B is a computer screen for establishing friendship preferences of a subscriber's profile utilized in the method of the present invention.

FIG. 6C is a computer screen for entering general interests of a subscriber's profile utilized in the method of the present invention.

FIG. 6D is a computer screen for entering matching criteria of a subscriber's profile utilized in the method of the present invention.

FIG. 6E is a computer screen for entering matching control of a subscriber's profile utilized in the method of the present invention.

FIG. 7 is a flow chart showing the method of creating groups in the present invention.

FIG. 7A is a computer screen for entering data to create groups through the method of the present invention.

FIG. 10 is a computer screen for entering data for finding new people for groups established by the method of the present invention.

FIG. 14A is a diagram illustrating the current one-on-one matching used in the prior art.

DESCRIPTION OF THE PREFERRED EMBODIMENT

Figure 1:
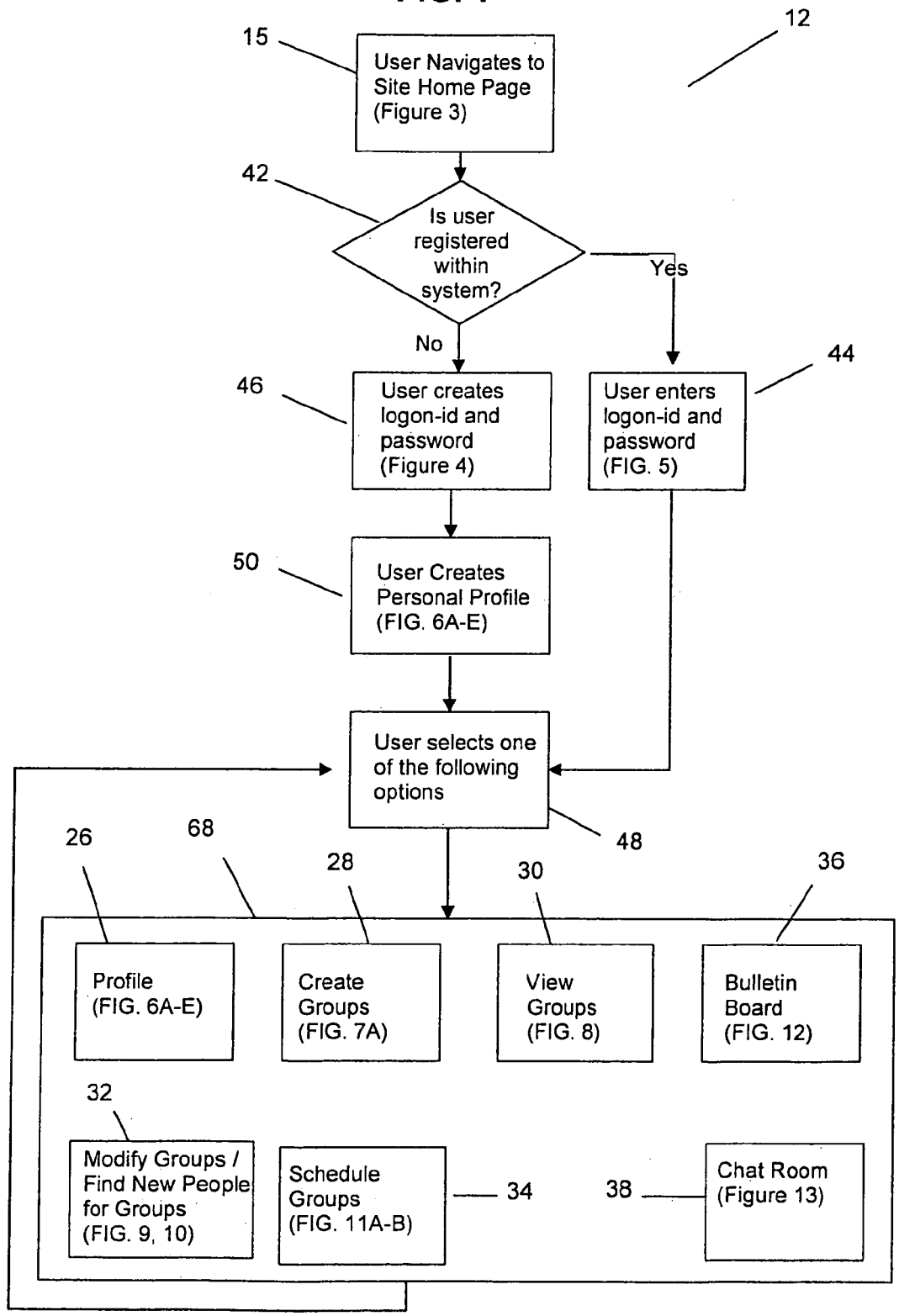
FIG. 1 is a flow chart of the website utilized in the method of the present invention.

Referring to the drawings, the present invention will now be described in detail with reference to the preferred embodiment.

As illustrated in FIGS. 1–13, the present invention provides a method for grouping computer subscribers by common preferences to establish non-intimate relationships. The method of the present invention is accessed by a web server (not shown) or a series of web servers (not shown) which are networked in a secured fashion to the internet (not shown). Other alternative configurations to the internet may also be utilized to access the method of the present invention. Those skilled in the art would recognize that other configurations such as a network, LAN, and interactive voice response systems may be utilized as an alternative to the internet.

In order to access the method of the present invention, the present invention provides a website 12 on the internet. A browser (not shown) may be utilized to access the website 12 provided on the internet. FIG. 1 shows a flowchart of the website 12. A subscriber or user (not shown) utilizes the browser to navigate to a home page 14 of the website 12, as seen in block 15 of FIG. 1. The home page 14 provides a screen similar to that shown in FIG. 3. The home page 14 displays a title 16 such as "Build a Friendship Home Page". In addition, the home page 14 has a welcoming inscription 17, along with a brief description 19 of the website 12 and basic instructions 21 for using the website 12. A list of headings 18 may also be listed on the home page 14 to allow the user to directly proceed to a specific heading 18. The headings 18 may include "home" 24; "profile" 26; "create groups" 28; "view groups" 30; "modify groups" 32; "schedule groups" 34; "bulletin board" 36; "chat room" 38.

Figure 3:
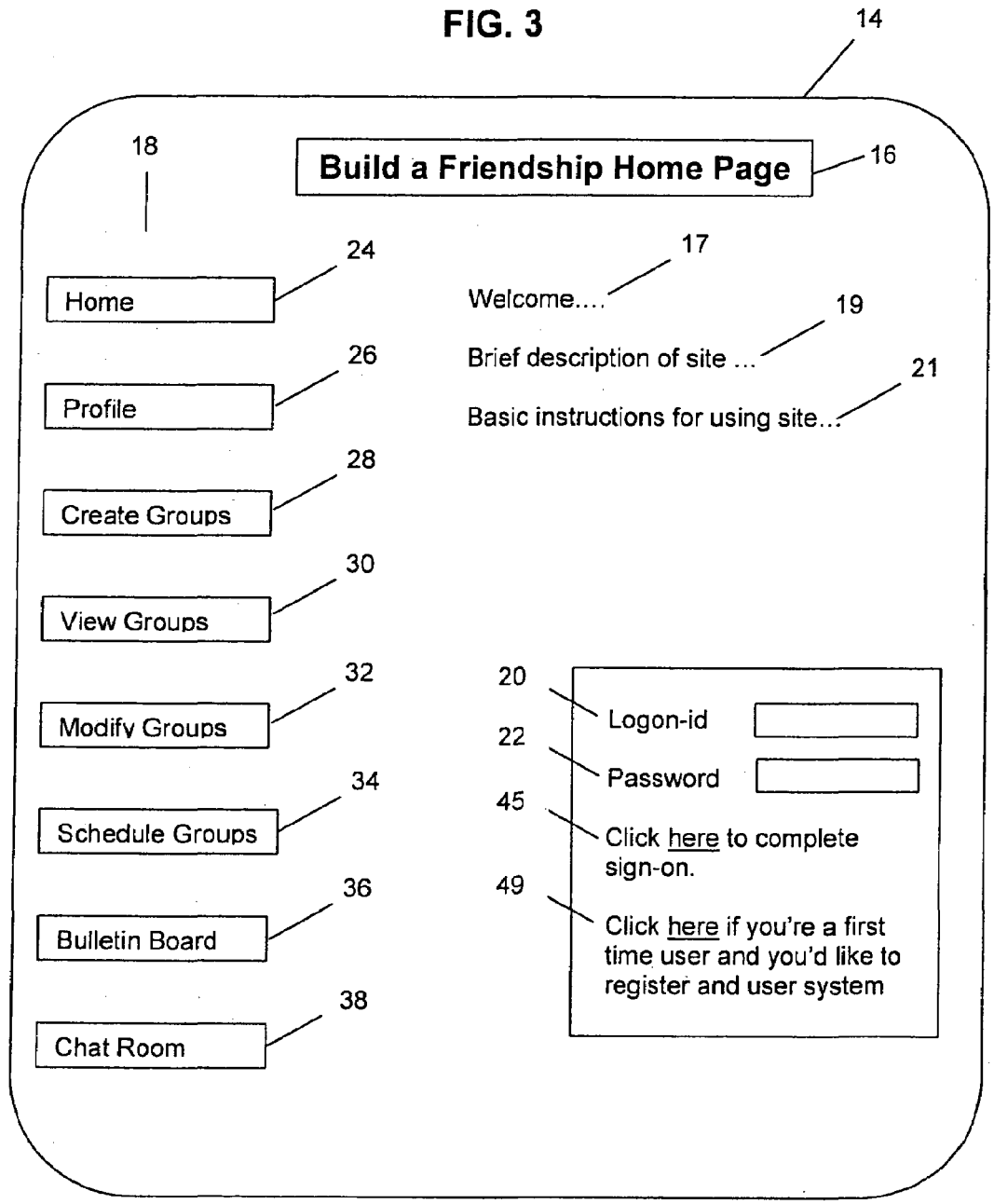
FIG. 3 is a home page computer screen for the method of the present invention.
Figure 4:
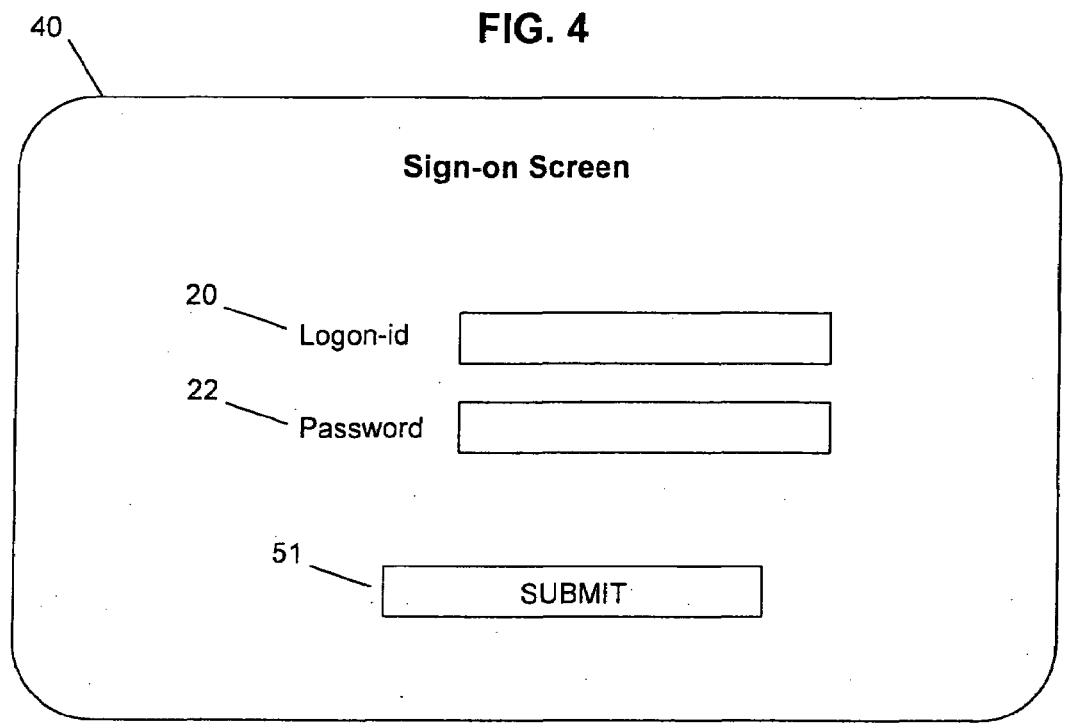
FIG. 4 is a sign-on computer screen to access the method of the present invention.
Figure 5:
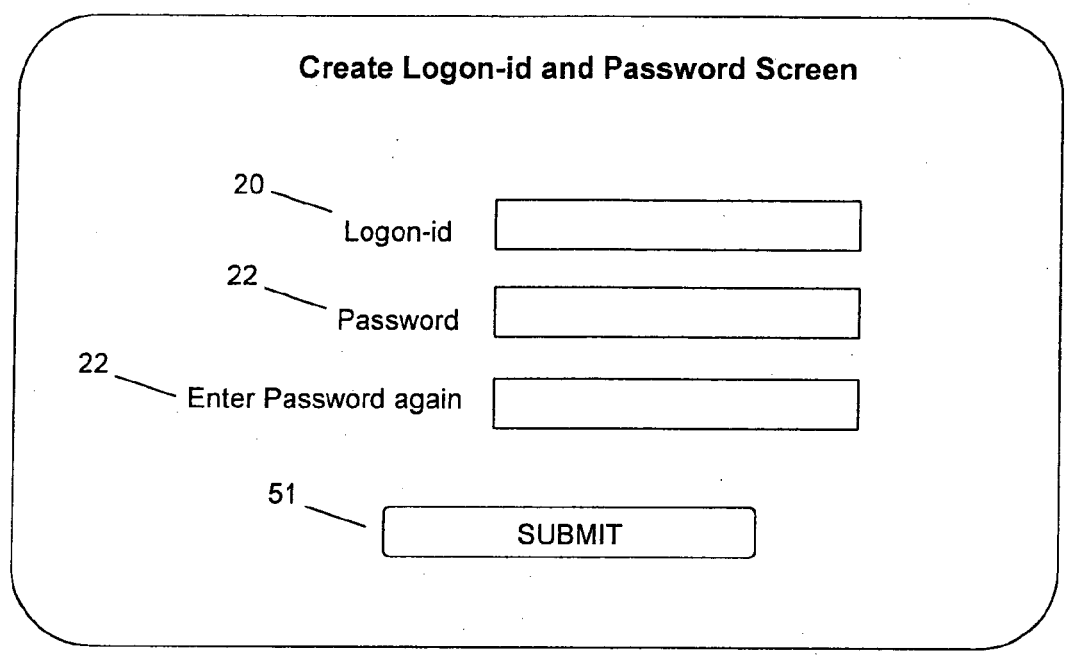
FIG. 5 is a create log-on identification and password computer screen for the method of the present invention.

To register with the website 12, the home page 14 queries the user for a log-on identification 20 and a password 22, as seen in decision block 42 of FIG. 1. The log-on identification 20 and password 22 allows for private access by the user to the user's personal profile. If the user has previously registered on the website 12, the user enters his log-on identification 20 and password 22, as seen in block 44 of FIG. 1, by typing in the appropriate log-on identification 20 and password 22 in the spaces provided on the home page 14 and clicking on the word "HERE" 45 for completing the sign on. The user is then directed to select one of the headings 18, as seen in block 48 of FIG. 1, prompting the user to enter the log-on identification 20 and password 22, as seen in FIG. 4. Alternatively, if the user previously registered with the website and attempts to directly access another web page before signing on, screen 40 will be displayed thereby prompting the user to enter the log-on identification 20 and password 22, as seen in FIG. 4. The initially requested screen will only be displayed after the user enters the log-on identification 20 and password 22 and then selects the submit button 51. If the user has not previously registered on the website 12, then the user must create a log-on identification 20 and password 22, as seen in block 46 of FIG. 1. The user clicks on the appropriate word "HERE" 49 on the home page 14, as seen in FIG. 3, and the user is directed to a screen for creating a log-on identification 20 and password 22, as seen in FIG. 5. The user types in a log-on identification 20 and a password 22 while confirming the password 22 by typing the password 22 in twice. The user clicks on "Submit" 51 and is then directed to create a personal profile, as seen in block 50 of FIG. 1.

To create a non-intimate, personal profile, the user is directed to a first computer screen of the profile heading 26, as seen in FIG. 6A. The data in the non-intimate, personal profile is compiled so that it may be compared to fellow subscribers' profiles in grouping the subscribers. The user begins creating its non-intimate, personal profile by entering identification information 52, as seen in block 52 of FIG. 6. As seen in FIG. 6A, the identification information 52 is generally biographical information 54, such as the user's name, city, state, zip code, phone and e-mail address. The user is also requested to enter background information, as seen in block 54 of FIG. 6, such as the user's birth year, race, religion, marital status, children, education level and job type, as seen in FIG. 6A.

The user is then directed to enter non-intimate, personal preferences regarding friendships, as seen in block 56 of FIG. 6. A separate computer screen, as seen in FIG. 6B, is utilized to collect data on friendship points 56. The user is requested to answer a series of questions regarding friendships. In responding to each question, the user is asked to rate the answer between the numbers 1 through 5 wherein the numerical values correspond to a range of answers explicitly explained by each question. For instance, question number 1 in FIG. 6B asks the user to "Describe your preferred style of conversation? (Where: 1—conservative and considerate, 5—direct hold no punches)". The user rates the answer between 1–5 based on what the user considers to be their preferred style of conversation and enters the number in the appropriate location. Each of the questions listed on the screen in FIG. 6B are to be responded to in a similar manner.

The user is next prompted to respond to a number of questions regarding the user's general interests, as seen in block 58 of FIG. 6. As seen in FIG. 6C, a separate computer screen prompts the user to list certain general interests 59 as classified by the headings "Sports (player)"; "Hobbies"; "Intellectual"; "Spiritual"; "Entertainment"; "Investing"; "Music". The screen may provide drop-down menus to allow the user to select from a number of listed general interests 59. Two columns may be provided to allow the user to select two general interests 59 within the same heading. The user is also prompted to list certain preferences 61, as seen in block 60 of FIG. 6. As seen in FIG. 6C, the user is prompted to enter the days and times which will be best to get together with fellow subscribers. In addition, the user is prompted to enter the largest group of people that they would like to get together with and the maximum driving distance that the user would be willing to drive in order to meet with fellow subscribers.

The user is then requested to provide specific matching criteria 63, as seen in block 62 of FIG. 6. As seen in FIG. 6D, a separate computer screen prompts the user to select items 65 that are important to the user. The user selects characteristics and item values that are important to the user and rates the characteristics on a scale from 1 to 10 as to how strongly the user feels about such characteristics. In addition, the user is asked to select characteristics 67 that fellow subscribers must not have in order to be included or grouped with the user. This data allows the user to specify what profile data is especially important in the matching process.

On a separate computer screen, as seen in FIG. 6E, the user is given the option of having matching control 69 wherein the user may decide whether the computer or fellow subscribers will match or group the user with fellow subscribers, as seen in block 64 of FIG. 6. The user indicates whether the user wishes only the computer to group the user with fellow subscribers or whether the user is willing to allow other fellow subscribers to place the user into groups. The user may also request that the user's profile no longer be provided to any other subscribers besides the subscribers in the current group in which the user has been grouped. The user may also decide to remove their profile from all groups including those in which the user has been selected. Once the data for the personal profile, as seen in FIGS. 6A–6E, has been collected, the user may create or update their profile, as seen in block 66 of FIG. 6, by clicking on "create/update my profile" 71, as seen in FIG. 6E. Once the user's personal profile has been created or updated, the user is directed back to the home page 14, where the user has the option of selecting any of the headings 18, as seen in block 68 of FIG. 1.

To group the user with fellow subscribers, the user selects the "create groups" heading 28 on the home page 14 of the website 12. The user is then directed to a computer screen for create groups 28, as seen in FIG. 7A. The user enters a group name, as seen in block 70 of FIG. 7, in order to identify the selected group. As seen in FIG. 7A, a box 73 is provided on the create groups computer screen 28 for entering the group name. The user is then requested to enter a certain match criteria, as seen in block 72 of FIG. 7, by entering characteristics 75 in which the user seeks from fellow subscribers, as seen in FIG. 7A. The user is also prompted to enter the number of people it wishes to have in the group 77, as seen in block 74 in FIG. 7 and as seen in FIG. 7A. Lastly, the user is prompted to enter geographic preferences 79 of group members, as seen in block 76 of FIGS. 7 and 79 of FIG. 7A. The create groups computer screen 28 prompts the user to enter the number of miles within a particular zip code in which the user would like fellow subscribers to be selected therefrom, as seen in FIG. 7A. After the create groups information has been entered, the groups may be created, as seen in block 78 of FIG. 7. The user clicks on "create group" 81 at the bottom of the create groups computer screen 28, as seen in FIG. 7A, to group the user with fellow subscribers. In so doing, the computer references the user's non-intimate, personal profile as well as the selections made under the "create groups" heading 28.

Figure 8:
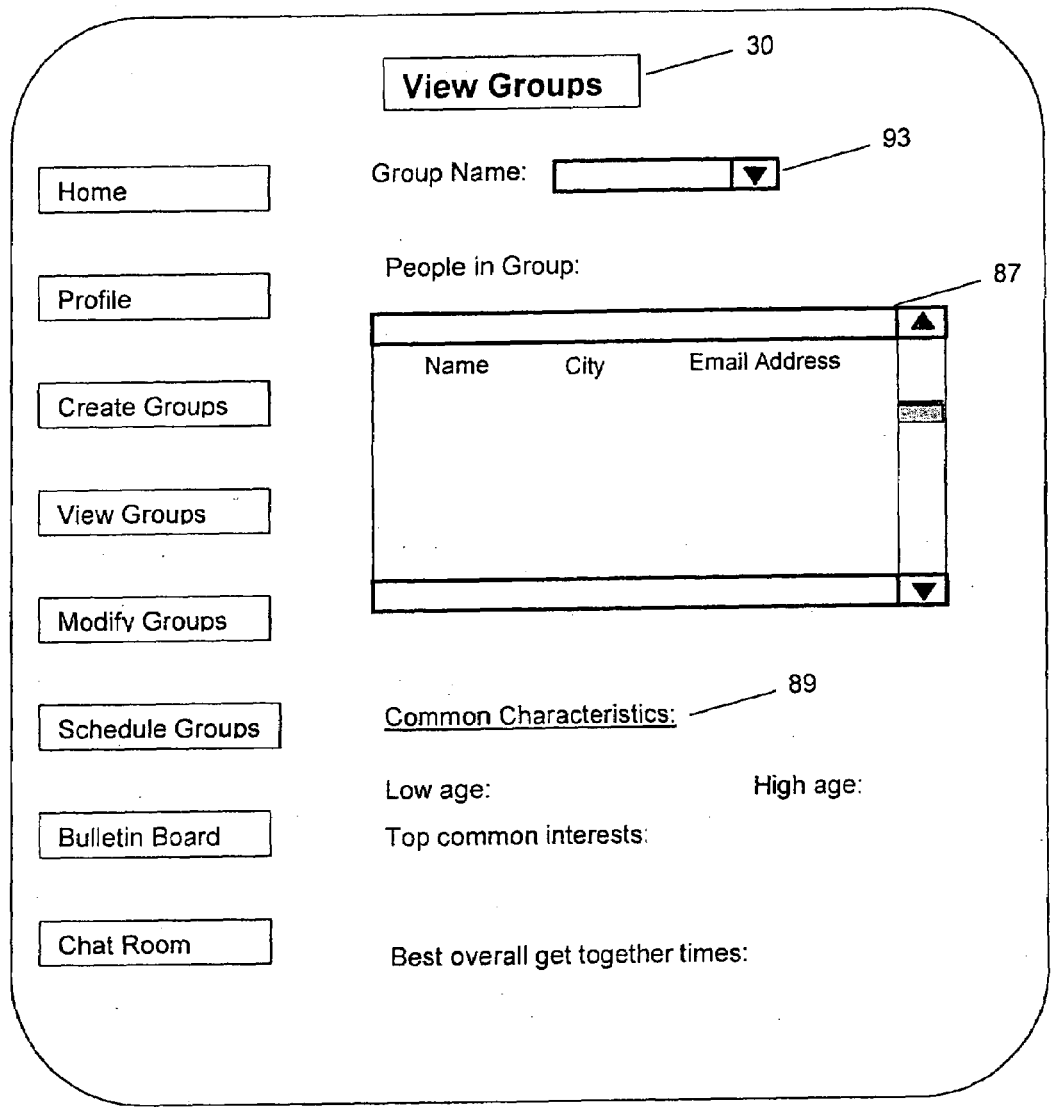
FIG. 8 is a computer screen for viewing groups established by the method of the present invention.

Once a group is created, the group is viewed on a separate computer screen having the heading "view groups" 30, as seen in FIG. 8. The view groups computer screen lists 30 the group name 93 that is being viewed. The user may select any previously formed group of which they are a member. The fellow subscribers selected for the group are listed by name, address and e-mail address 87. The user may scroll through the list of grouped subscribers. The view group screen 30 also lists common characteristics 89 among the subscribers, for example, the low and high age of the selected subscribers, the top common interests between the subscribers, and the best overall get-together times between the selected subscribers in the group are listed.

Figure 9:
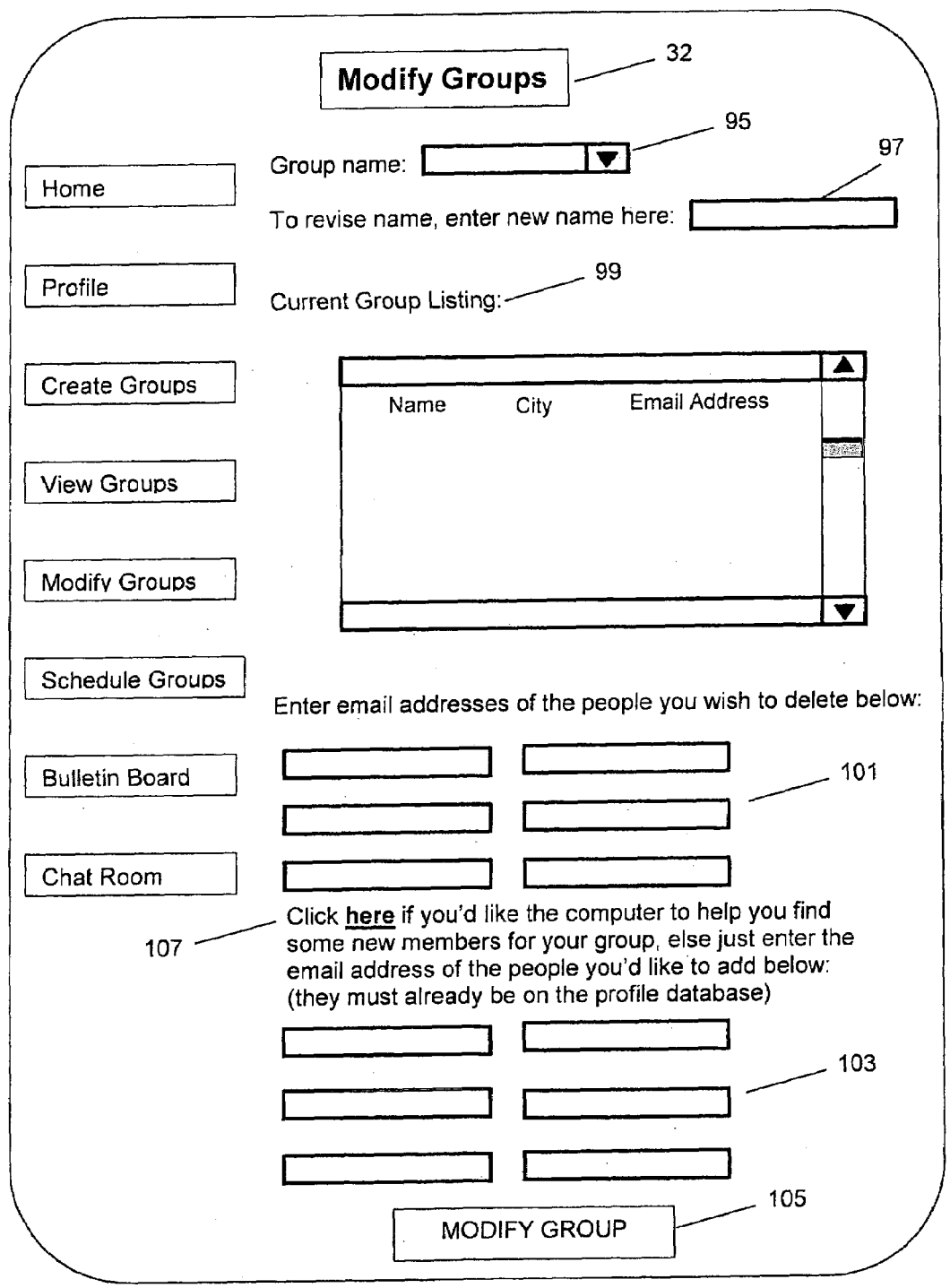
FIG. 9 is a computer screen for entering data to modify the groups established by the method of the present invention.

To modify the groups, the user may select the heading "modify groups" 32, as seen in FIG. 1. The user selects the "modify groups" heading 32 on any of the computer screens, and the user is directed to a computer screen having the "modify groups" heading 32, as seen in FIG. 9. A box having a drop down menu feature is provided for entering the group name 95. If the user wishes to revise the group name, the user enters the new name in a prompted location 97 on the computer screen. If the user does not wish to change the group name, then the user simply does not enter a revised name in the prompted location. A list of the subscribers selected to the group named is displayed in a current group listing 99 of names, addresses, and e-mail addresses. If the user wishes to delete any of the subscribers from the group, the user is prompted to enter the e-mail addresses of those subscribers in which the user wishes to delete from the group. The computer screen of the heading modify groups 32 provides boxes 101 for the user to enter the e-mail addresses of those subscribers the user wishes to delete from the group. If the user wishes to add subscribers to the group, then the user may enter the e-mail addresses of the requested subscribers in the prompted areas 103. Once the added and deleted subscribers have been listed, the user may modify the group by clicking on "modify group" 105.

The user may also decide to have the computer add new members to the group. To have the computer find new members, the user simply clicks on "click here" 107, as seen in FIG. 9. The user is directed to a computer screen entitled "Find New People for Groups", as seen in FIG. 10. The user may have the computer utilize the standard matching criteria to select the new subscriber for the group, as shown by option No. 1, or the user may select the matching criteria that the user wishes the computer to use, as shown by option No. 2. If the user wishes to use the standard criteria, then the user selects option No. 1 and clicks on "Find and Add New People to Group" 109. If the user wishes to identify the matching criteria itself, then the user selects option No. 2 and enters the matching criteria interests 111 in the prompted locations. The user is prompted to list the number of people to add to the group 113, as well as enter a geographic preference 115. The user enters the number of miles within a zip code as a geographic preference. After the necessary information is entered, the user clicks on "Find and Add New People to Group" 109, and the computer generates the newly added people to the group. These new people are viewed in the "view groups" screen 30, as shown in FIG. 8A.

Figure 11:
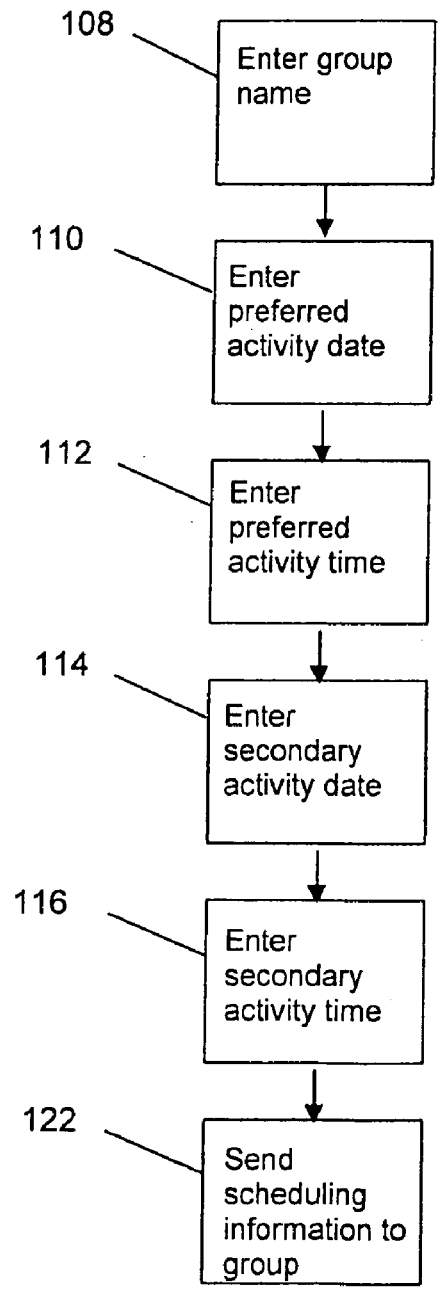
FIG. 11 is a flow chart showing the steps for scheduling groups established by the method of the present invention.
Figure 11A:
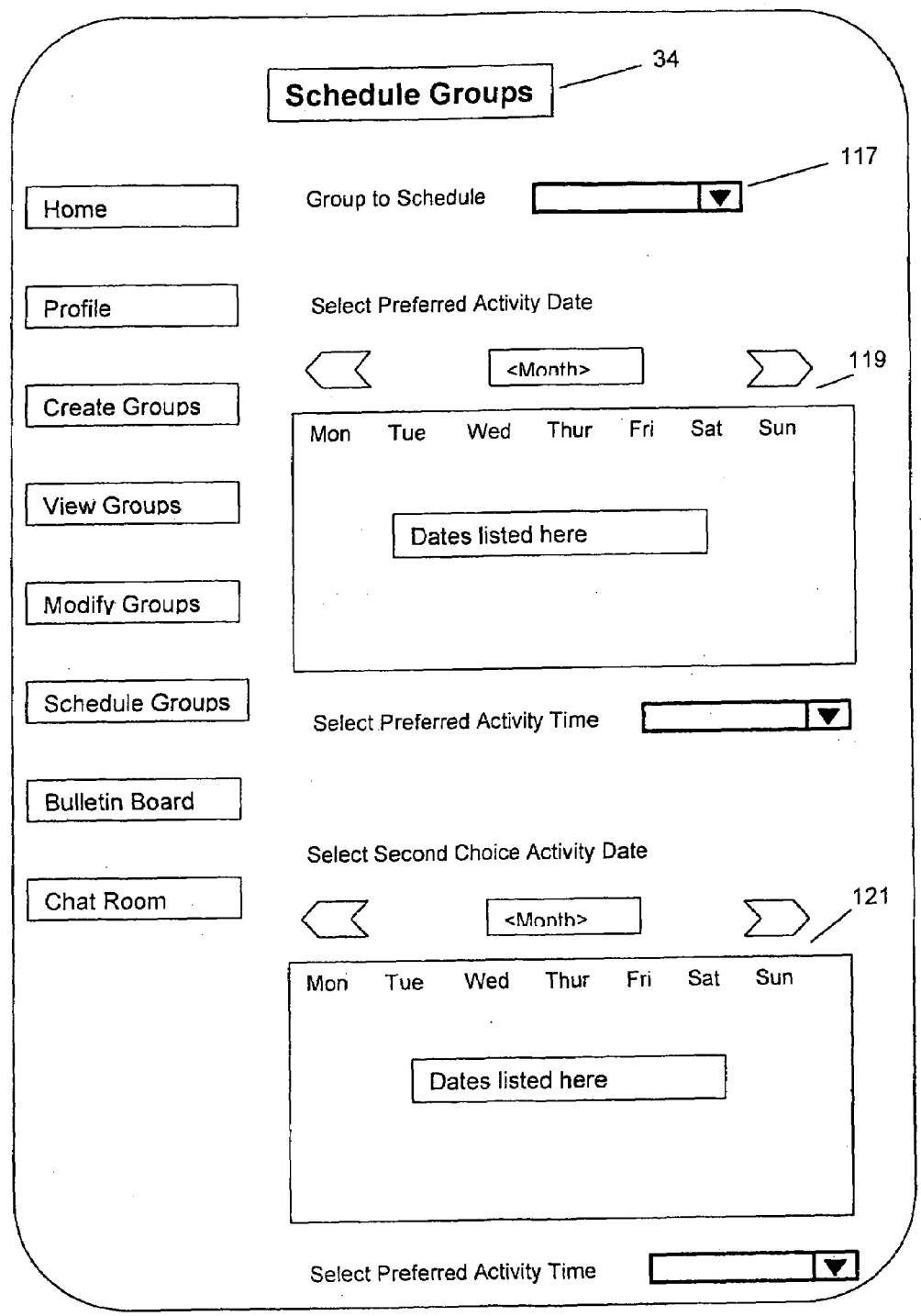
FIG. 11A is a computer screen for scheduling group activities for the groups established by the method of the present invention.
Figure 11B:
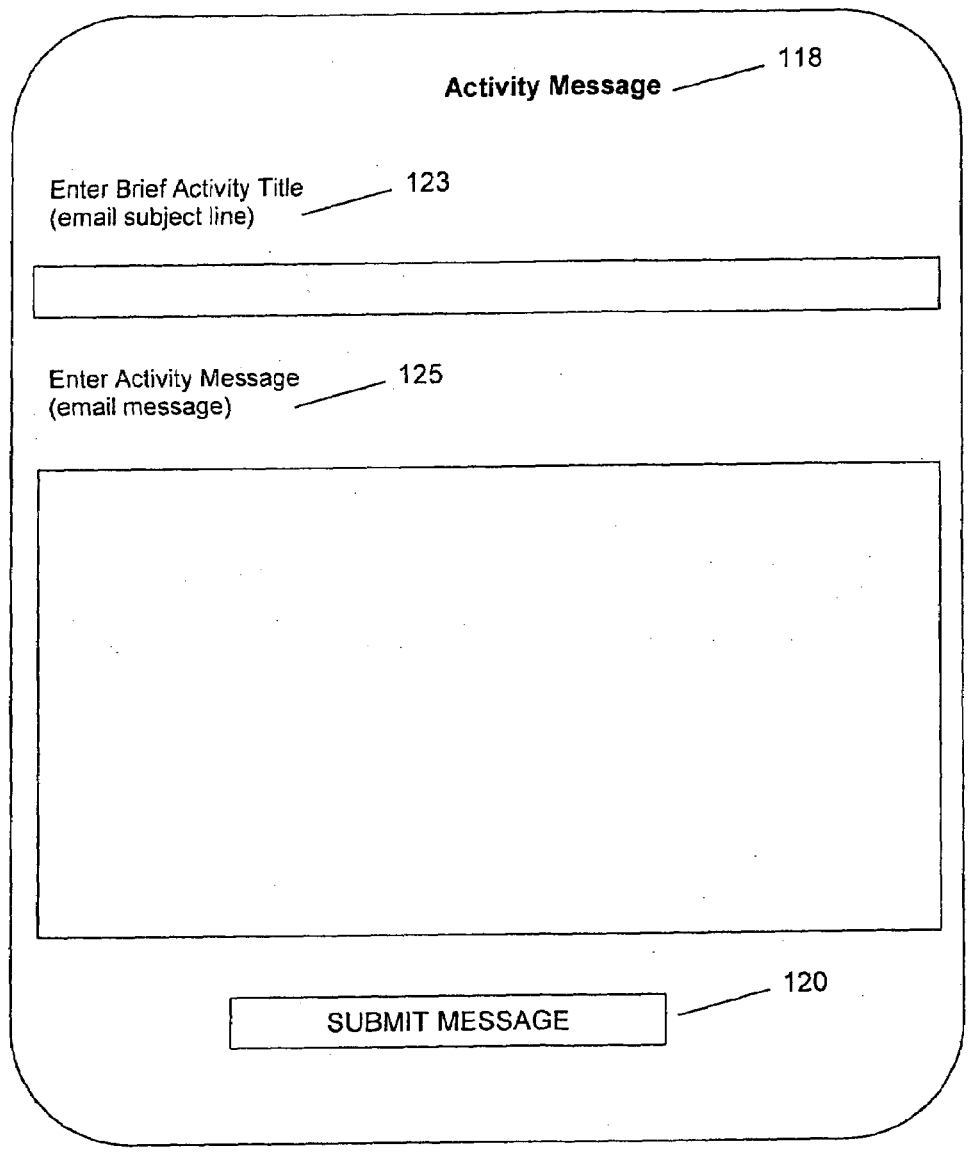
FIG. 11B is a computer screen for posting activity messages for groups established by the method of the present invention.

To schedule meetings for the selected groups, the user selects the "schedule groups" heading 34. The user is directed to a computer screen having the schedule groups heading 34, shown in FIG. 11A. As seen in block 108 of FIG. 11, the user identifies the group name that is to be scheduled by entering the group name in the indicated box 117, as seen in FIG. 11A. A preferred activity date, as seen in block 110 of FIG. 11, and a preferred activity time, as seen in block 112 of FIG. 11, are selected by the user. Drop down calendars and times 119 allow the user to easily reference dates and times as seen in FIG. 11A. A second choice activity date and time may also be provided, as seen in blocks 114 and 116 of FIG. 11. Similar drop down calendars and times 121 are also provided for the second choice activity dates and times, as seen in FIG. 11A. The schedule groups heading 34 also has a second computer screen, as seen in FIG. 11B, entitled "activity message" 118. The activity message screen 118 allows the user to enter an activity title 123 for the group as well as an activity message 125 for the group to correspond with the scheduled dates and time. The user clicks on "submit message" 120, as seen in FIG. 11B, and the scheduled dates and times 119, 121 as well as the activity messages 123, 125 are automatically forwarded to the e-mail addresses of each of the subscribers of the group, as seen in block 122 of FIG. 11.

Figure 12:
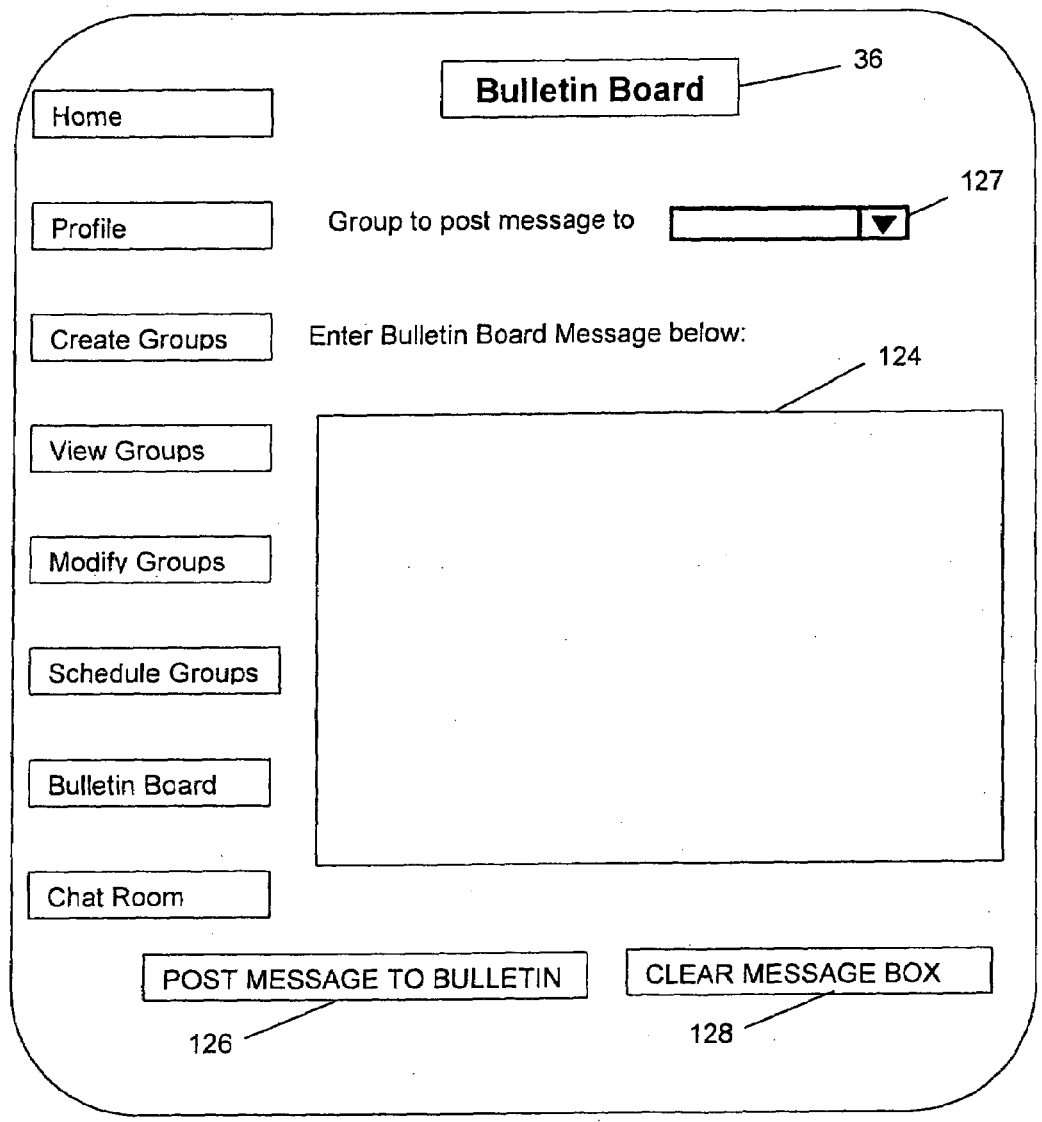
FIG. 12 is a computer screen for posting messages on a bulletin board for groups established by the method of the present invention.

In order to post a bulletin board message to the selected subscribers of the group, the user may select the "bulletin board" heading 36. The user is directed to a computer screen entitled "bulletin board" 36, as seen in FIG. 12, and prompted to list the group name 127 in which the message is to be posted. An empty box 124 is provided on the computer screen to allow the user to type in a bulletin board message. The user may click on "Post Message to Bulletin Board" box 126 to post the message on a bulletin board for which other group members may view, or the user may click "clear message box" 129 to clear any bulletin board message that has been posted.

Figure 13:
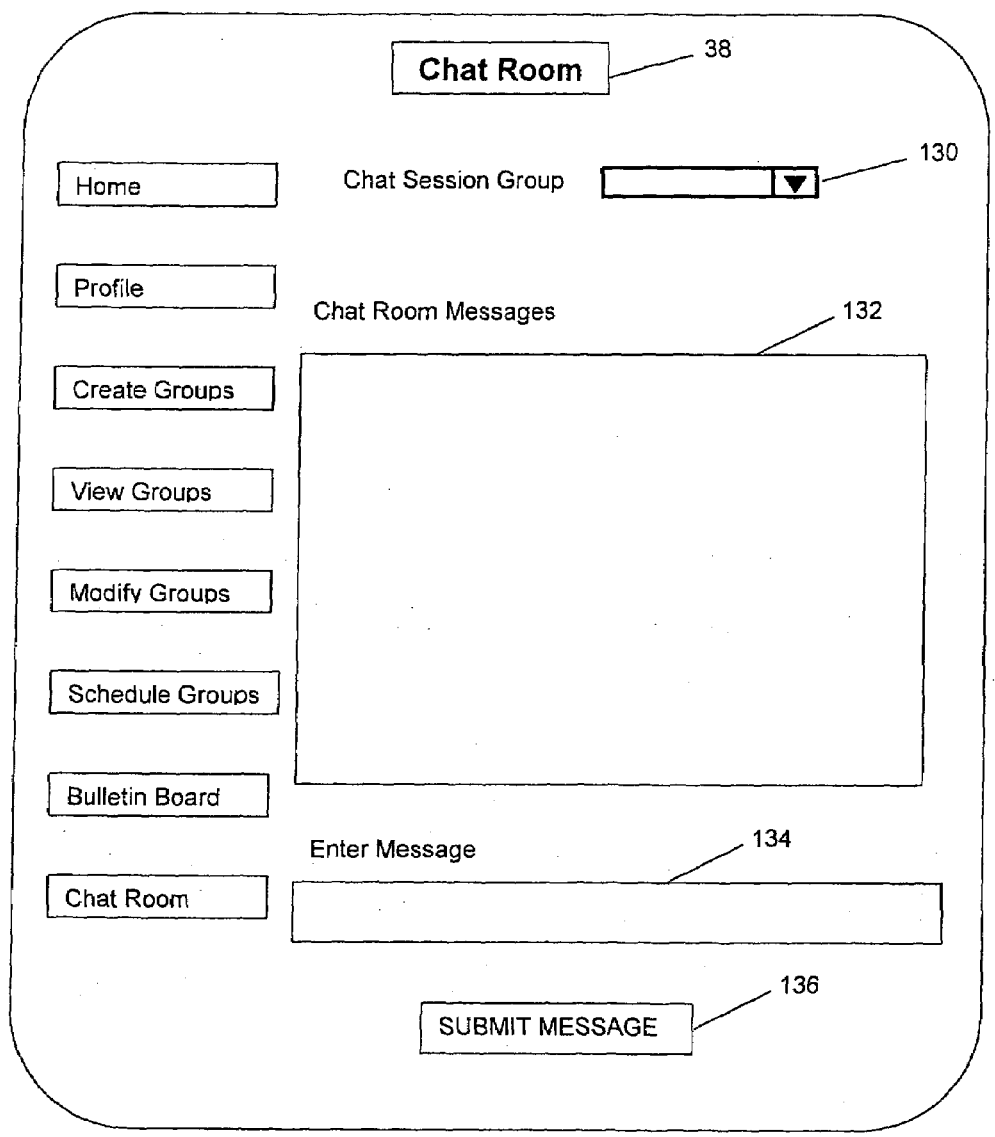
FIG. 13 is a computer screen for chat room messages for groups established by the method of the present invention.

For the user to participate in real time dialog with fellow group members, the user selects the "chat room" heading 38. The user is directed to a computer screen entitled "Chat Room" 38, as seen in FIG. 13, and prompted to enter the group name in a box 130 in which the chat session is to be held therewith. A box entitled "chat room messages" 132 displays the real time dialog that is being sent by e-mail from the group members. The smaller box entitled "enter message" 134 is an area for which the user may prepare a message to be sent to the chat room. When the user has completed formulating its message, the user clicks on heading "Submit Message" 136, and the e-mail message is sent to all of the group members in the group.

It should be noted that the present invention is not limited to the grouping of individuals, but rather, the present invention may also include the grouping of groups established by a level of similarity of non-intimate preferences between groups. For example, groups that were established based on different interests or preferences may have a different interest or preference between groups thereby making the groups a candidate for creating one common group.

In operation, the user accesses the website 12 by searching the internet through a browser or simply entering the website address. Once the user finds the home page 14 of the website 12, as seen in FIG. 3, the user registers with the website 12 by obtaining a log-on identification 20 and a password 22. If the user has already registered with the website 12, then the user simply enters their existing identification 20 and password 22, as seen in FIG. 3 or 4. If the user is not registered, then the user must obtain a log-on identification 20 and password 22, as seen in FIG. 5, and build a non-intimate personal profile. To build a non-intimate personal profile, the user is directed to the "create profile" heading 26 wherein the user is cued to enter biographical and personal preferences, as seen in FIGS. 6A–6E. Once a personal profile is built and stored, the user can optionally create a group by clicking on the "create groups" heading 28. The user selects a group name and the general interests and geographic preferences in which the user desires to have the group chosen thereby, as seen in FIG. 7A. The user clicks on the button "create group" to have the computer compare the user's personal profile and the subscribers' personal profiles and choose a group therefrom. In so doing, the computer algorithm assigns integer answer values to the preferences provided by the user. In turn, these items are matched against other subscribers falling in the specified geographical area wherein their preferences are also assigned integer answer values, matched to the primary user through a quantified number obtained from a fuzzy logic table lookup, summed, and then compared to group subscribers into a common group.

Table lookups are performed by concatenating the answer values of two subscribers being compared to form a key and then using the resulting key used to access the similarity value contained within the table corresponding to the question wherein the higher the value, the higher the similarity. In some other cases, table lookups are performed by concatenating the answer value of one subscriber with the corresponding characteristic of another subscriber. This would, for example, be the case whereby a subscriber specifies to only be matched with other married men.

Algorithm also considers subscriber data such as "characteristics your friends must not have" listed in 67 of FIG. 6D to prevent certain subscribers from being considered for inclusion in a subscriber's group.

Figure 14B:
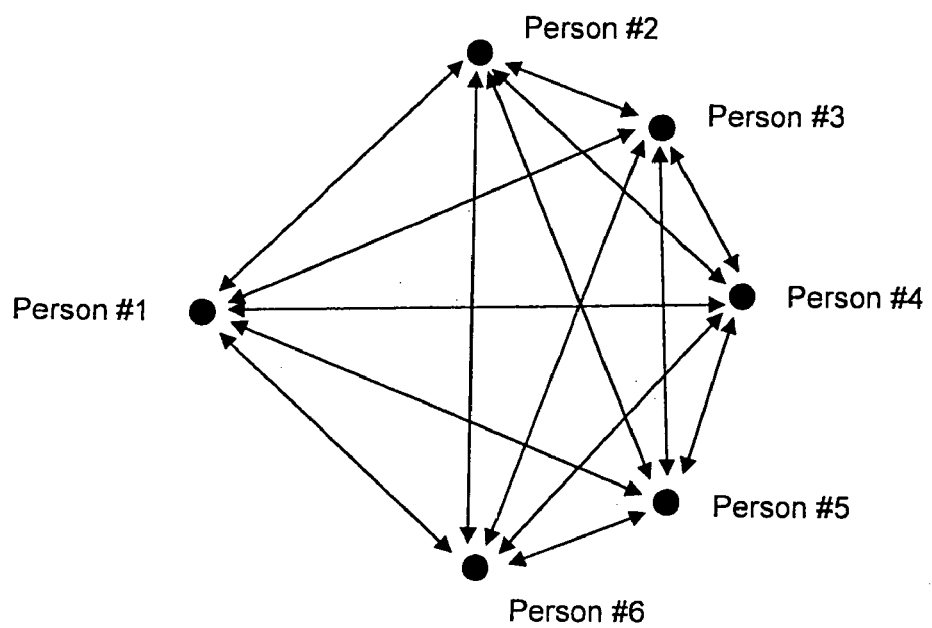
FIG. 14B is a diagram illustrating the many-to-many matching utilized in the present invention.

Upon developing the summed comparison values between all subscribers, the algorithm seeks to develop groups wherein the calculated similarity values between all subscribers in a group are greater than the threshold value. It should be noted that to be considered for inclusion of a group, the algorithm performs a multi-way match between subscribers, as illustrated in FIG. 14B to ensure that each subscriber's preferences are considered. Thus for a subscriber to make it into a group, two conditions must be met through the above-described calculations. First, each subscriber's preferences must be met by all other subscribers in the group. Secondly, all other subscribers' preferences in the group must be met by said subscriber. If a subscriber cannot be matched into a group during a processing cycle, they are placed into a queue and given priority of processing during the next cycle.

The similarity values of subscribers being matched and the user creating the group must exceed threshold values before a subscriber is included in the common group being created by the user. Once the user is grouped with at least two fellow subscribers, the group members and their common characteristics may be viewed, as seen in FIG. 8. The user may modify the group by deleting members from the group or searching and adding new members to the group through the modify groups heading 32, as seen in FIG. 9A. The user can also schedule group meetings and have those meetings e-mailed automatically to the group members by accessing the schedule groups heading 34, as seen in FIGS. 11A–11B. In addition, the user may utilize the bulletin board 36 for leaving messages to group members by accessing the "bulletin board" heading 36, as seen in FIG. 12. The user may also engage in real time dialog by entering into a chat room with the other members of the group by accessing the "chat room" heading 38, as seen in FIG. 13. Once the user is finished using the website, the user exits back to the home page 14 and closes the window to the website 12.

Figure 2:
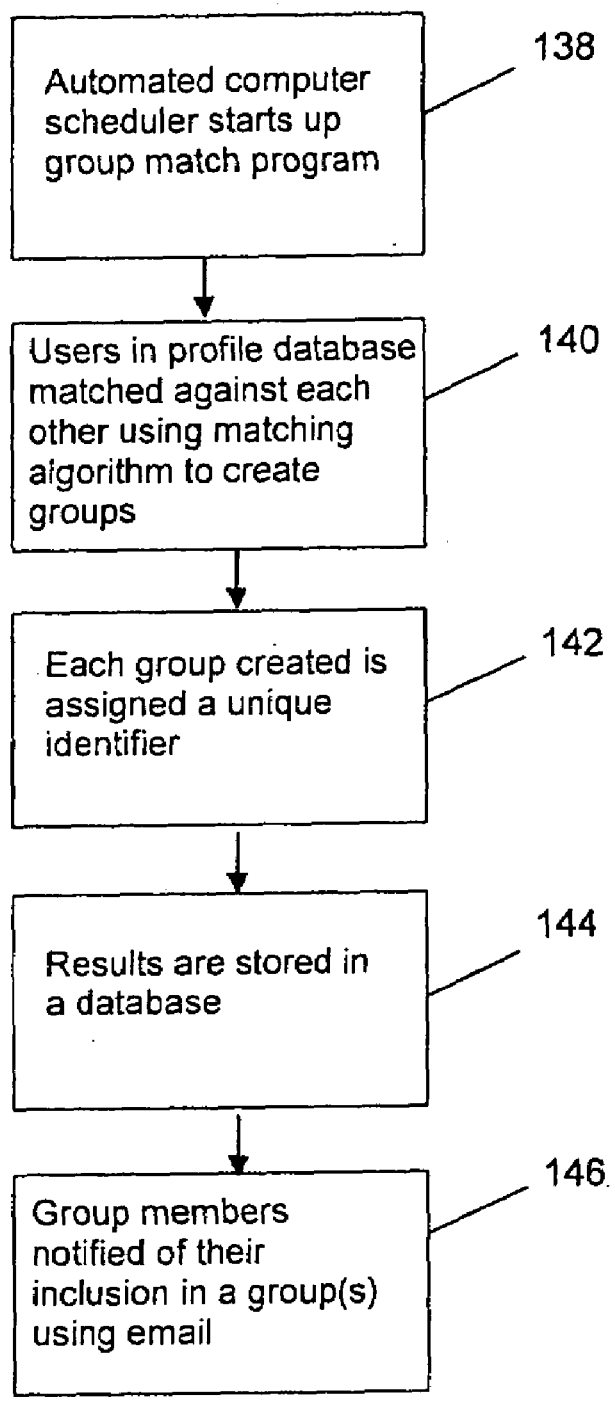
FIG. 2 is a flow chart of the batch run method utilized in the present invention.

Although the method disclosed is driven by the user accessing the website 12 and providing directives through the website 12, the present invention also provides an automated computer batch run system that automatically groups subscribers, as seen in FIG. 2. A computer scheduler starts a batch run of the create groups 28 heading on a periodic basis, as seen in block 128. The computer uses the matching algorithm to establish groups, as seen in block 140, and assign a group name or unique identifier to the group, as seen in block 142. The results of the groupings are stored in a database, as seen in block 144, and the group members are then notified of the groupings, as seen in block 146. By providing batch runs on the computer, the present invention can provide a more comprehensive and accurate analysis of the personal profiles of the subscribers.

While the invention has been described in connection with what is presently considered to be the most practical and preferred embodiment, it is to be understood that the invention is not to be limited to the disclosed embodiments, but to the contrary, it is intended to cover various modifications and equivalent arrangements included within the spirit and scope of the appended claims, the scope is to be accorded the broadest interpretation so as to encompass all such modifications and equivalent structures as is permitted under the law.

The invention claimed is:

1. A method for grouping subscribers by common preferences, the steps comprising:
    providing a subscriber access to a computerized database having stored profile information from fellow subscribers;
    registering and storing profile information from said subscriber into said database;
    grouping said subscriber with at least two of said fellow subscribers to form at least one group based on similarities between said subscriber's profile information and said fellow subscribers' profile information wherein all of the subscribers' profiles in said group are similar to each other;
    utilizing an algorithm to determine a level of similarity between said subscriber's profile information and said fellow subscribers' profile information, wherein preferences are assigned integer values concatenated to form a lookup key, and used to access an entry in a table containing the corresponding similarity value between two preferences; and
    summing similarity values for all profile preferences to create a final similarity total for said subscribers; and
    communicating said final similarity of said group to said subscribers.

2. The method stated in claim 1, wherein said step of utilizing an algorithm further comprises the steps of:
    requiring that the similarity values between subscribers exceeds a threshold value.

3. A method for grouping subscribers by common preferences, the steps comprising:
    providing a subscriber access to a computerized database having stored profile information from fellow subscribers;
    registering and storing profile information, including biographical information on personal preferences, of said subscriber into said database;
    entering a group selection criteria that identifies characteristics and interests which subscribers must have to be included in a candidate group;
    creating a candidate list of subscribers based on the group selection criteria;
    grouping said subscribers from said candidate list with at least two fellow subscribers to form at least one group based on similarities between said subscriber's profile information and said fellow subscribers' profile information wherein all of the subscribers' profiles in said group are similar to each other;
    grouping said subscriber with at least two of said fellow subscribers by applying an algorithm to determine a level of similarity between said subscriber and said fellow subscribers, wherein preference disclosed in said subscriber's profile information are assigned integer values concatenated to form a lookup key and used to access an entry in a table containing the corresponding similarity value between the two preferences;
    summing similarity values for all profile preferences to create a final similarity total for said subscribers;

providing capability whereby said subscriber selects final group members from the candidate list; and displaying said group of said subscribers.

4. The method stated in claim 3, wherein the size of the group can be specified for grouping of said subscribers into said group.

5. The method stated in claim 4, wherein the subscribers' preferred meeting times are considered as criteria in grouping said subscribers into said group.

6. A method for grouping subscribers by common preferences, comprising the steps of:

providing a subscriber access to a computerized database having stored profile information from fellow subscribers;

registering and storing profile information of said subscriber into said database;

using an algorithm to determine a level of similarity between said subscriber and other subscribers' profile information, wherein profile fields are assigned values and used to create a lookup key to access an entry in a table containing the corresponding similarity value between two fields;

summing similarity values for said subscriber and other subscribers to create final similarity totals between subscribers;

grouping said subscriber with at least two of said fellow subscribers to form at least one group based on similarity totals between all subscribers in said group; and communicating said final similarity of said group to said subscribers.

7. A method for grouping subscribers by common preferences, comprising the steps of:

providing a subscriber access to a computerized database having stored profile information from fellow subscribers;

registering and storing profile information of said subscriber into said database;

using an algorithm to determine a level of similarity between said subscriber and other subscribers' profile information, wherein profile fields are assigned values and used to create a lookup key to access an entry in a table containing the corresponding similarity value between two fields;

summing similarity values for said subscriber and other subscribers to create final similarity totals between subscribers;

grouping said subscriber with at least two of said fellow subscribers to form at least one group wherein multiple fields in each subscribers' profile are similar; and communicating said final similarity of said group to said subscribers.

8. A method for grouping subscribers by common preferences, comprising the steps of:

providing a subscriber access to a computerized database having stored profile information from fellow subscribers;

registering and storing profile information of said subscriber into said database;

using an algorithm to determine a level of similarity between said subscriber and other subscribers' profile information, wherein profile fields are assigned values and used to create a lookup key to access an entry in a table containing the corresponding similarity value between two fields;

summing similarity values for said subscriber and other subscribers to create final similarity totals between subscribers;

grouping said subscriber with at least two of said fellow subscribers to form at least one group of a specified size wherein multiple fields in each subscribers' profile are similar; and communicating said final similarity of said group to said subscribers.

* * * * *